No. 873,694. PATENTED DEC. 10, 1907.
A. E. ABBOTT.
WEIGHING AND MEASURING DEVICE.
APPLICATION FILED MAR. 15, 1907.
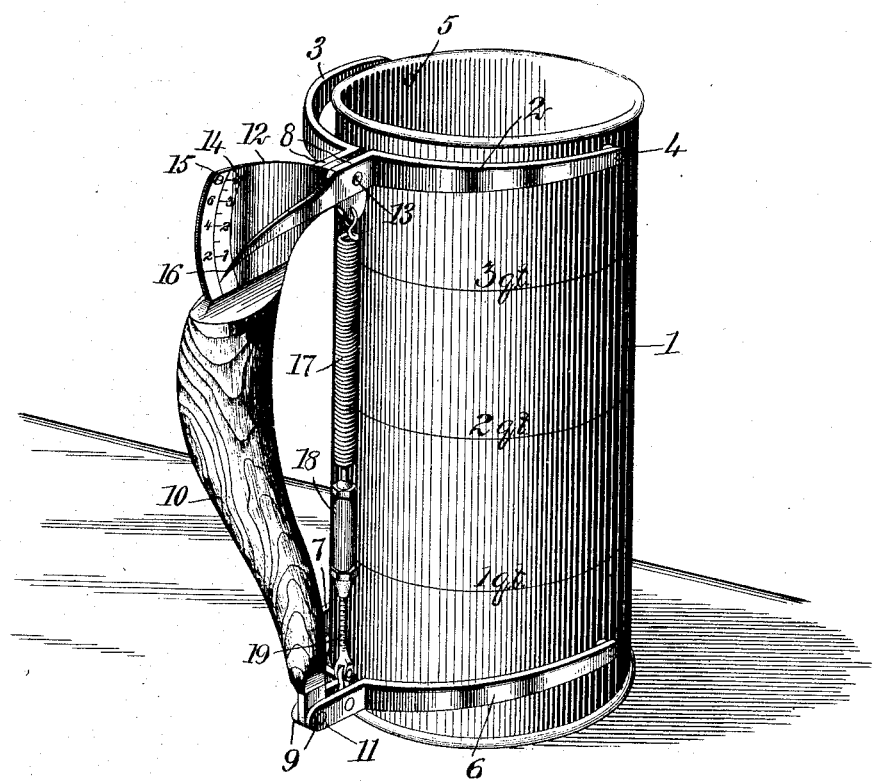
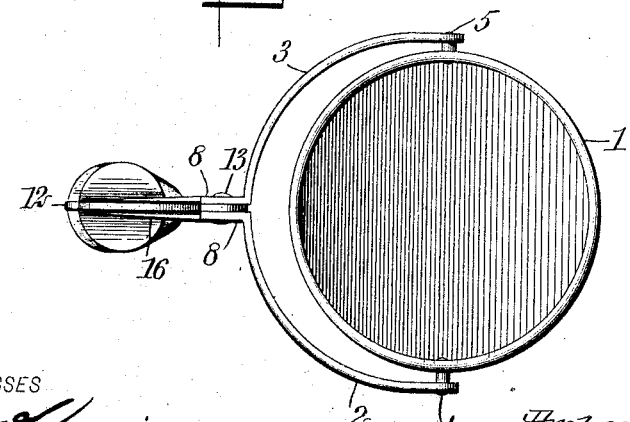
WITNESSES
INVENTOR
Ambrose E. Abbott
BY
ATTORNEYS

UNITED STATES PATENT OFFICE.

AMBROSE EDGAR ABBOTT, OF TWIN FALLS, IDAHO.

WEIGHING AND MEASURING DEVICE.

No. 873,694.   Specification of Letters Patent.   Patented Dec. 10, 1907.

Application filed March 15, 1907. Serial No. 362,487.

*To all whom it may concern:*

Be it known that I, AMBROSE EDGAR ABBOTT, a citizen of the United States, and a resident of Twin Falls, in the county of Cassia and State of Idaho, have invented a new and Improved Weighing and Measuring Device, of which the following is a full, clear, and exact description.

This invention relates to improvements in devices for dispensing materials in desired quantities, the object being to provide a device of this character that will be simple in construction, accurate in operation, and inexpensive.

I will describe a weighing and measuring device embodying my invention and then point out the novel features in the appended claims.

Reference is to be had to the accompanying drawings forming a part of this specification, in which similar characters of reference indicate corresponding parts in all the figures.

Figure 1 is a perspective view of a weighing and measuring device embodying my invention; and Fig. 2 is a plan thereof.

While I have shown the receptacle for material in the form of a cup, it may be otherwise formed without departing from the spirit of my invention.

Referring to the drawings, 1 designates a receptacle for liquid or dry material to be measured or weighed, which is pivotally connected at the top and bottom to yoke members. The upper yoke member consists of two arms or sections 2, 3, pivoted respectively as at 4, 5, and the bottom yoke consists of two similar arms or sections 6, 7. The upper yoke members or sections have outwardly extended portions 8, and the lower yoke members have outward extensions 9. The handle 10 has its lower end pivoted between the extensions 9 as indicated at 11 and on the upper end of the handle is a scale-plate 12 which is pivoted between the members or projections 8 as indicated at 13, and on this plate 12 are graduates 14, 15, for indicating the amount of material in the receptacle, the amount being indicated by means of a pointer 16 extending from one of the projections 8 and movable over the scale.

As a means for balancing the receptacle I employ a spring 17 which is connected at the upper end to the plate 12 just below its pivotal point, and at its lower end the spring is connected to an adjusting nut 18 which connects with a screw 19 pivotally connected to the projections 9. By means of the nut or sleeve 18 and the screw engaging therewith, the tension of the spring may be regulated.

The operation of the device is quite obvious, that is, when it is held free by means of its handle, and material is placed in the receptacle 1, the said receptacle will be moved downward relatively to the handle and of course this will move the pointer to indicate the amount of material in the receptacle.

Having thus described my invention I claim as new and desire to secure by Letters Patent:—

1. A device for the purpose specified, comprising a receptacle for material, yoke members having pivotal connection with the receptacle at the upper and lower ends, a handle having pivotal connection with the yokes, a scale-plate on the upper end of the handle, a pointer carried by the upper yoke member and movable over said scale-plate, and a spring connection between said scale-plate and the lower yoke.

2. A device for the purpose specified, comprising a receptacle for material, a yoke member having pivotal connection with the upper portion of the receptacle, a yoke having pivotal connection with the lower portion of the receptacle, a handle, a graduated plate on the upper end of the handle and having pivotal connection with the upper yoke, a pointer on the upper yoke for moving over the scale, the said handle also having pivotal connection with the lower yoke, a spring extending from the graduated plate to said lower yoke, and means for adjusting the tension of the spring.

In testimony whereof I have signed my name to this specification in the presence of two subscribing witnesses.

AMBROSE EDGAR ABBOTT.

Witnesses:
JOHN CASEY,
JOE POMATTO.